(12) United States Patent
Balafoutis et al.

(10) Patent No.: US 10,609,176 B2
(45) Date of Patent: *Mar. 31, 2020

(54) METHOD AND SYSTEM FOR REAL-TIME RESOURCE CONSUMPTION CONTROL IN A DISTRIBUTED COMPUTING ENVIRONMENT

(71) Applicant: Unify GmbH & Co. KG, Munich (DE)

(72) Inventors: Elias Balafoutis, Zografou (GR); Grigorios Prasinos, Agia Paraskevi (GR)

(73) Assignee: Unify GmbH & Co. KG, Munich (DE)

( * ) Notice: Subject to any disclaimer, the term of this patent is extended or adjusted under 35 U.S.C. 154(b) by 0 days.

This patent is subject to a terminal disclaimer.

(21) Appl. No.: 16/402,815

(22) Filed: May 3, 2019

(65) Prior Publication Data
US 2019/0273806 A1 Sep. 5, 2019

Related U.S. Application Data

(63) Continuation of application No. 15/525,855, filed as application No. PCT/EP2015/002038 on Oct. 15, 2015, now Pat. No. 10,334,070.

(30) Foreign Application Priority Data

Nov. 11, 2014 (DE) .................. 10 2014 016 648

(51) Int. Cl.
*H04L 29/08* (2006.01)
*G06F 9/50* (2006.01)

(52) U.S. Cl.
CPC ........ *H04L 67/2861* (2013.01); *G06F 9/5061* (2013.01); *G06F 9/5088* (2013.01);
(Continued)

(58) Field of Classification Search
None
See application file for complete search history.

(56) References Cited

U.S. PATENT DOCUMENTS 5,579,222 A 11/1996 Bains et al.
6,842,783 B1 6/2005 Boivie et al.
(Continued)

FOREIGN PATENT DOCUMENTS

WO 200033214 A1 6/2000
WO 2012125144 A1 9/2012

OTHER PUBLICATIONS

Östberg, P., et al., Decentralized Prioritization-Based Management Systems for Distributed Computing, 2013 IEEE 9th International Conference on e-Science, 2013, pp. 228-237.
(Continued)

*Primary Examiner* — Thomas J Dailey
(74) *Attorney, Agent, or Firm* — Buchanan Ingersoll & Rooney PC (57) ABSTRACT

A system for real-time resource consumption control in a distributed environment and a corresponding method can include a multitude of server instances having access to shared resources, whereby each request for a shared resource issued by a client application is handled by one of the server instances. A global resource consumption counter, representing the overall resource consumption of the multitude of server instances at a given time and a multitude of proxy servers can also be included. Each proxy server can include a receiver module for receiving resource consumption requests issued from a client application, a resource consumption decision module, a queue for collecting resource consumption requests, a local resource consumption counter representing the global resource consumption as seen by the respective proxy server, and/or a synchronization module for
(Continued)

synchronizing the global resource consumption counter by interfacing with all other server instances.

20 Claims, 3 Drawing Sheets

(52) U.S. Cl.
CPC .......... *H04L 67/10* (2013.01); *H04L 67/1002* (2013.01); *H04L 67/28* (2013.01); *H04L 67/2804* (2013.01); *H04L 67/2833* (2013.01); *H04L 67/2866* (2013.01)

(56) References Cited

U.S. PATENT DOCUMENTS

| | | |
|---|---|---|
| 7,054,943 B1 | 5/2006 | Goldszmidt et al. |
| 7,231,445 B1 | 6/2007 | Aweya et al. |
| 7,676,576 B1 | 3/2010 | Kommula |
| 7,849,019 B2 | 12/2010 | Grimm et al. |
| 7,965,630 B1 | 6/2011 | Floyd et al. |
| 8,078,483 B1 | 12/2011 | Hirose et al. |
| 8,713,092 B2 | 4/2014 | Kumbalimutt et al. |
| 8,930,489 B2 | 1/2015 | Goetz et al. |
| 2003/0135339 A1 | 7/2003 | Gristina et al. |
| 2004/0230675 A1 | 11/2004 | Freimuth et al. |
| 2004/0267897 A1 | 12/2004 | Hill et al. |
| 2006/0080486 A1 | 4/2006 | Yan |
| 2012/0159502 A1 | 6/2012 | Levin et al. |
| 2012/0259982 A1 | 10/2012 | Tatsubori et al. |
| 2012/0278440 A1 | 11/2012 | Iyer |
| 2014/0143300 A1 | 5/2014 | Karlsson et al. |

OTHER PUBLICATIONS

Plagemann, T., et al., Operating System Support for Multimedia Systems, Computer Communications 23, 2000, pp. 267-289, Elsevier Science Ltd.

Sharifian, S., et al., An approximation-based load-balancing algorithm with admission control for cluster web servers with dynamic workloads, Springer Science + Business Media, LLC, Jul. 3, 2009, pp. 440-463.

Vercauteren, T., et al., Hierarchical Forecasting of Web Server Workload Using Sequential Monte Carlo Training, IEEE: Transactions on Signal Processing, Apr. 2007, vol. 55, No. 4, pp. 1286-1297.

International Search Report (PCT/ISA/210) dated Jan. 4, 2016 by the European Patent Office as the International Searching Authority for International Application No. PCT/EP2015/002038.

Written Opinion (PCT/ISA/237) dated Jan. 4, 2016 by the European Patent Office as the International Searching Authority for International Application No. PCT/EP2015/002038.

METHOD AND SYSTEM FOR REAL-TIME RESOURCE CONSUMPTION CONTROL IN A DISTRIBUTED COMPUTING ENVIRONMENT

CROSS REFERENCE TO RELATED APPLICATIONS

This application is a continuation application of U.S. patent application Ser. No. 15/525,855, which is the United States national phase under Section 35 U.S.C. Section 371 of International Application No. PCT/EP2015/002038, which was filed on Oct. 15, 2015 and claims priority to DE 10 2014 016 648.1, filed on Nov. 11, 2014.

BACKGROUND OF THE INVENTION

Field of the Invention

The present invention relates to a method for real-time resource consumption control in a distributed computing environment. Furthermore, the present invention relates to a computer program product for executing this method, a computer readable data carrier with the computer program product stored thereon, and a system being developed to carry out the aforementioned method.

Background of the Related Art

Distributed computing environments are typically made up of several systems and resources and consolidate applications for carrying out a specific function across different locations. One example of a distributed computing environment is a SaaS (Software as a Service) environment (being considered as a part of cloud computing), where users subscribe to paid services by a service provider. The service provider monitors the consumption of resources by the users and enforces a limit to the resources users can consume according to what each user has paid for.

An example would be a system offering telephony services, where the users are charged on a monthly basis for the total duration (e.g., minutes) of outgoing calls. A more relevant example is where users prepay for a certain amount of outgoing call duration and the telephony service provider enforces this time limit by monitoring whether a user trying to place a call has already reached the prepaid limit.

In a collaborative SaaS environment the services might be offered to user groups rather than individual users, and the corresponding resources (e.g., outgoing call duration for the example above) can be consumed by any user in the group.

An example would be a collaborative application such as a file sharing service, where users in a group can exchange files by uploading them to a repository which is accessible by all the users in the group. The consumable resource in this example would be the amount of storage space allocated to the group. All users in a group can upload files to the repository and therefore consume a portion of the shared storage space. The service provider has to monitor the used storage space in the group and enforce that no user can upload more files than the available storage space in the group.

Figure 1:
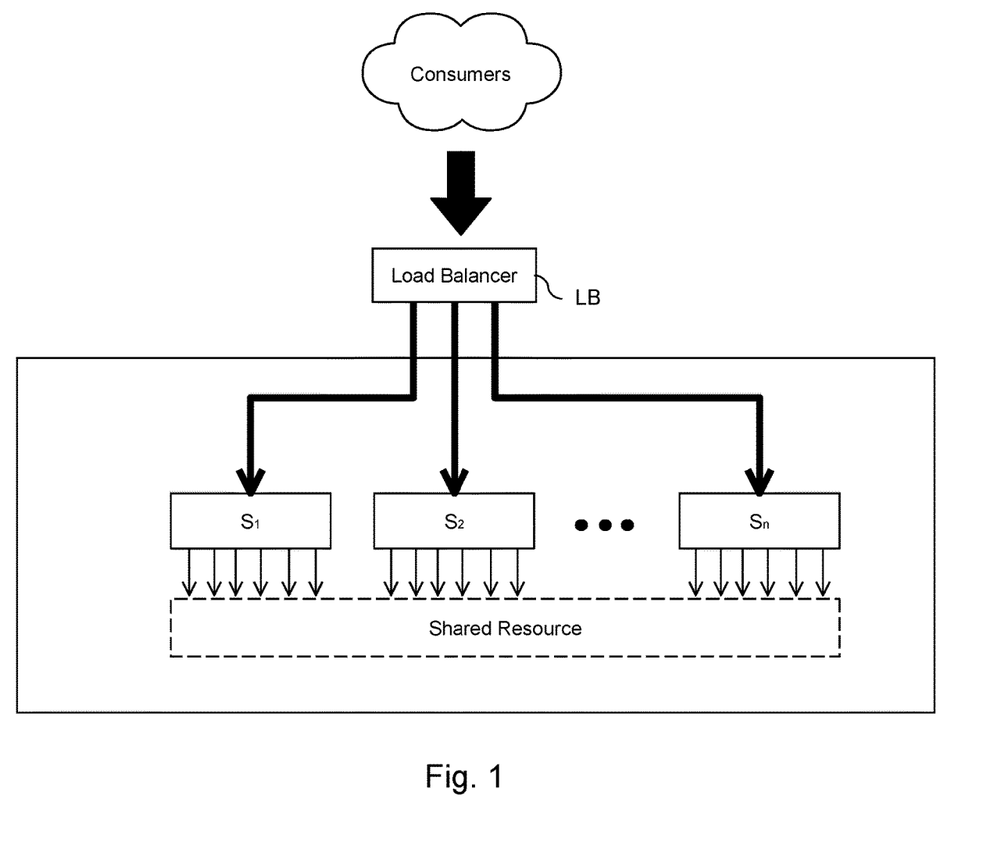
FIG. 1 schematically shows a distributed computing environment.

In a large SaaS environment, user requests are distributed to a multitude of server instances in a manner where different users in a group may be served by different instances of the server which provides a given service. Such an environment is illustrated in FIG. 1, wherein $S_x$, i.e., $(S_1-S_n)$ represents a multitude of server instances providing a certain service/feature which users in a group are paying for. Consumers, i.e., members of the group are accessing this cloud service, resulting in different users in a group being served by different instances of the server which provides the given service. The servers $S_x$ are competing to consume a shared resource, thus causing delay in the decision process. Optionally, a load balancer LB may be used when consumers are accessing the service. A load balancer is a device that acts as a reverse proxy and distributes network or application traffic across a number of server instances. Load balancers are used to increase capacity (concurrent users) and reliability of applications.

It is, however, clear for the skilled worker that the present invention is not restricted to SaaS applications but can be used in other distributed computing environments as well.

When considering the file sharing service described in the example above, where different servers receive file upload requests by the users of a group, the enforcement of the storage space limit allocated to the group requires the consistent update of the group's used storage counter across all server instances by the service provider.

In another example, real time communication (RTC) services such as voice/video and web collaboration are offered to groups of users, and are charged by the service provider based on the total monthly duration of RTC sessions within the group, with a limit on the maximum duration per month. The consumption of this resource changes at such a rate that maintaining a consistent count across a large number of server instances would introduce a delay beyond what is considered acceptable for a real time voice/video service.

U.S. Pat. No. 5,579,222 discloses a distributed license administration system using a local policy server to communicate with a license server and control execution of computer programs. One computer, acting as a license server, identifies the nodes currently using the licensed software, handles the license conditions and checks whether or not these conditions are still met upon adding a new node. Each node maintains a policy server database, which specifies the license conditions for this node. A policy server daemon communicates with the license server, interfaces with the database and decides whether to grant or deny access to the licensed software.

In U.S. Pat. No. 7,849,019, floating licenses are managed by a central license server. This server assigns a number of licenses to secondary license managers, which in turn grant licenses to clients as requested. Each secondary server counts the licenses granted and released during a period of time and sends the values to the central license server to synchronize this server. The central server adjusts the number of licenses available at the secondary servers. The method allows to temporarily exceed the total number of available licenses.

The cited state of the art solutions show the problems that they either do not consider the lack of real-time responsiveness when a large amount of users compete for resources provided by a multitude of server instances or do need excessive synchronization between instances.

BRIEF SUMMARY OF THE INVENTION

It would be helpful to provide a method and a system for real-time resource consumption control in a distributed computing environment without excessive synchronization between instances.

The solution to the problem provides a method for real-time resource consumption control in a distributed computing environment, wherein this environment comprises a multitude of server instances having access to shared resources, whereby each request for a shared resource issued by a client application is handled by one of the server instances; a global resource consumption counter representing the overall resource consumption of the multitude of server instances at a given time; and a multitude of proxy servers. Each proxy server comprises a receiver module for receiving resource consumption requests issued from a client application, a resource consumption decision module for accepting or rejecting a resource consumption request, a queue for collecting resource consumption requests that have been locally accepted by the respective proxy server, a local resource consumption counter representing the global resource consumption as seen by the respective proxy server, whereby the local resource consumption counter is updated every time a resource consumption request is accepted by the decision module and the updated value being provided in turn as an input to the decision module, and a synchronization module for synchronizing the global resource consumption counter by interfacing with all other server instances.

BRIEF SUMMARY OF THE FIGURES

Exemplary embodiments of the present invention are explained below with reference to the drawings. In the drawings.

DETAILED DESCRIPTION OF THE INVENTION

As noted above, embodiments may provide a method for real-time resource consumption control in a distributed computing environment, wherein this environment comprises a multitude of server instances having access to shared resources, whereby each request for a shared resource issued by a client application is handled by one of the server instances; a global resource consumption counter representing the overall resource consumption of the multitude of server instances at a given time; and a multitude of proxy servers. Each proxy server comprises a receiver module for receiving resource consumption requests issued from a client application, a resource consumption decision module for accepting or rejecting a resource consumption request, a queue for collecting resource consumption requests that have been locally accepted by the respective proxy server, a local resource consumption counter representing the global resource consumption as seen by the respective proxy server, whereby the local resource consumption counter is updated every time a resource consumption request is accepted by the decision module and the updated value being provided in turn as an input to the decision module, and a synchronization module for synchronizing the global resource consumption counter by interfacing with all other server instances.

In a first step, the amount of resource consumption of a request received by the receiver module and accepted by the resource consumption decision module is read from the queue. Subsequently, the local resource consumption counter is synchronized with the global resource consumption counter by adding the amount read in the first step to the global resource consumption counter. Then, the local resource consumption counter is updated with a local copy of the global resource consumption counter value from the second step, and the updated global resource consumption counter value is provided as an input to the resource consumption decision module of the respective proxy server. On every new request read from the queue, the difference between the value of the local copy of the global resource consumption counter value and the global resource consumption counter value at the time of synchronization is determined and the global resource consumption by the decision module is projected based on the difference determined in the preceding step and the time elapsed since the last synchronization of the local copy of the global resource consumption counter and the actual global resource consumption at the time of each synchronization step.

By carrying out the steps of this method, the decision of a decision module, whether a resource consumption request is accepted or rejected, is based on an estimation or projection of the global resource consumption using data which are locally available at each proxy server at the time a decision has to be taken. Thus, there is no need for excessive synchronization between instances.

The solution to the problem also provides a system for real-time resource consumption control in a distributed computing environment. This system comprises a multitude of server instances having access to shared resources, whereby each request for a shared resource issued by a client application is handled by one of the server instances; a global resource consumption counter, representing the overall resource consumption of the multitude of server instances at a given time and a multitude of proxy servers. Each of these proxy servers in turn comprises a receiver module for receiving resource consumption requests issued from a client application, a resource consumption decision module for accepting or rejecting a resource consumption request, a queue for collecting resource consumption requests that have been locally accepted by the respective proxy server, a local resource consumption counter representing the global resource consumption as seen by the respective proxy server, whereby the local resource consumption counter is updated every time a resource consumption request is accepted by the decision module, and the updated value is provided in turn as an input to the decision module. Finally, the system comprises a synchronization module for synchronizing the global resource consumption counter by interfacing with all other server instances.

With such a system, it is possible to determine the resource's availability at each proxy server at the time a decision has to be taken, whether a resource consumption request can be accepted or has to be rejected.

The term "resource" used herein should be interpreted in a rather broad way. "Resource" may refer to any physical or virtual entities of limited availability, e.g., memory, processing capacity, network speed, etc.

In some embodiments, the decision module does not have dependencies on other decision modules. The method is therefore fault tolerant as a failure in one decision module does not have effects to other decision modules. A decision can be taken very fast as all calculating means are contained in the decision module, hence the method applies for real time applications, such as communication applications. Decision taking can scale to infinity by employing an unlimited number of decision modules, as all calculating means are contained in each decision module.

According to a further embodiment, the calculating means are self contained in the decision module. Many different sophisticated decision algorithms can be employed.

In a further embodiment, the algorithm parameters on each decision module are periodically adjusted according to global resource consumption.

A further embodiment has a good fault tolerance: On the event of a failure at one server instance, the load balancer directs new resource consumption requests to other server instances. Further, it has a good scalability: As demand for resource consumption increases, new server instances can be added so that new resource consumption requests are balanced across a larger set of server instances.

A still further embodiment has the ability to easily adapt to the increasing/decreasing demand for resource consumption by dynamically allocating computing power (e.g. new server instances) out of a virtually unlimited pool of physical resources.

FIG. 1 schematically shows a distributed computing environment, consisting of a multitude of server instances $S_x$, i.e. ($S_1$-$S_n$) having access to shared resources, whereby each request for a shared resource issued by a consumer or client application CA is handled by one of the server instances $S_x$. An optional load balancer LB distributes all requests issued by the client application CA to the multitude of server instances $S_x$.

Figure 2:
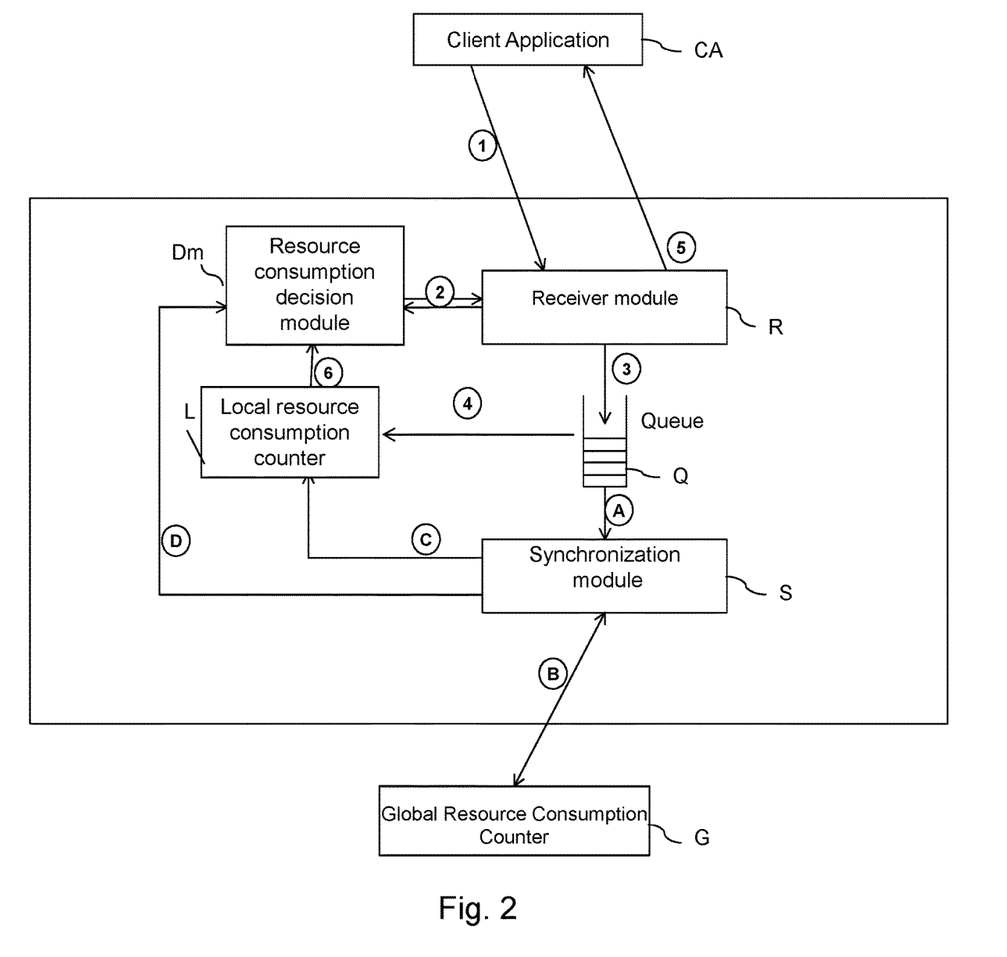
FIG. 2 schematically shows the structure of a proxy server according to the present invention, and FIG. 3 schematically shows an embodiment of the present invention using a central resource management system.

A global resource consumption counter G, representing the overall resource consumption of the multitude of server instances $S_x$ at a given time forms part of the distributed computing environment (cf. FIG. 2).

Figure 3:
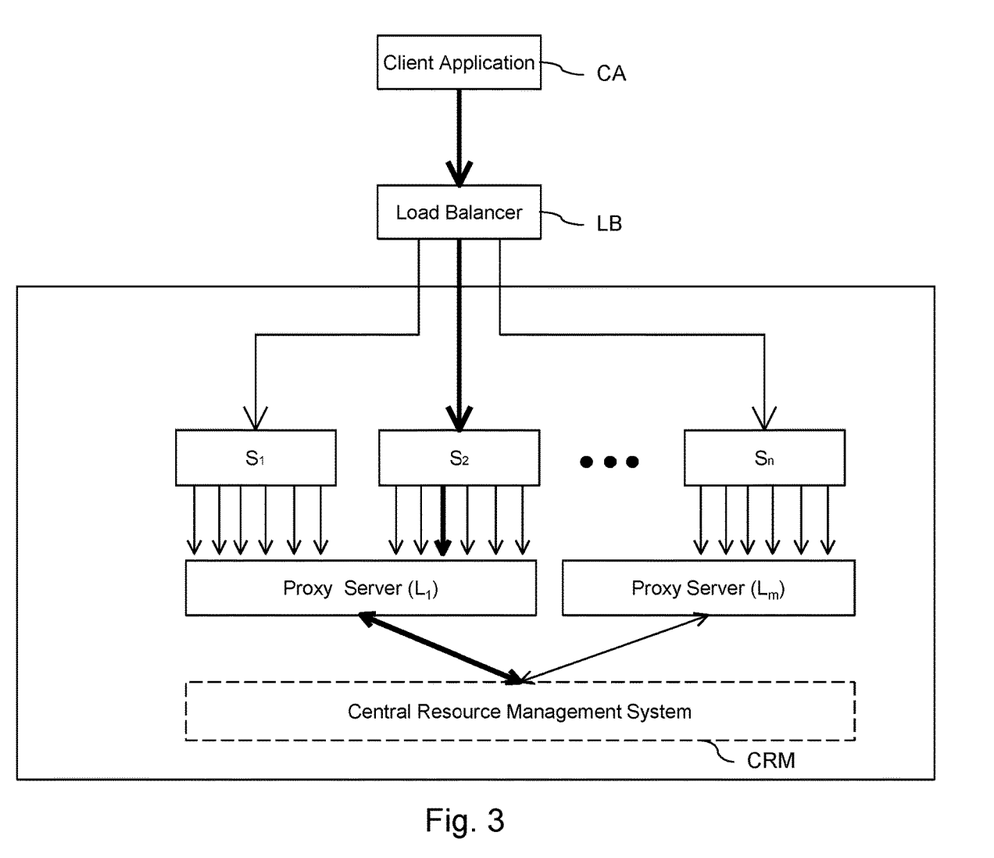

The distributed computing environment further comprises a multitude of proxy servers $L_x$, i.e. ($L_1$-$L_m$) being assigned to the server instances $S_x$ (cf. FIG. 3). The structure of these proxy servers is illustrated in FIG. 2. Each proxy server $L_x$ comprises:

- a receiver module R for receiving resource consumption requests, each resource consumption request consisting of the identity of the requesting entity (e.g. user or group of users) and the amount of resources that are to be consumed by this particular request;
- a resource consumption decision module Dm, which implements a calculating means whose output is a positive or negative answer whether to accept a resource consumption request or not. As will be described later, the decisions taken by the decision module Dm are strictly based on data which are available locally, i.e., at each proxy server, to the system at any given time. The calculating means may be represented by a respective algorithm;
- a local resource consumption counter L, representing the global resource consumption as seen by any single proxy server $L_x$. It is incremented every time a resource consumption request which arrives at the receiver module R is accepted by the decision module Dm. In a distributed computing environment with many independent instances, local resource consumption counter L represents the sum of the global resource consumption counter G known to the given local proxy server $L_x$ plus the resource consumption locally accepted by the respective decision module Dm;
- a queue Q for storing resource consumption requests that have been locally accepted by the respective proxy server $L_x$; and
- a synchronization module S for synchronizing the global resource consumption counter G of the environment by interfacing with all other server instances $S_x$, the global resource consumption counter G representing the overall resource consumption of the multitude of server instances $S_x$.

There are two functions that are running asynchronously and in parallel in every proxy server $L_x$. Asynchronously in the present case means that both functions are running independently, i.e., one function does not have to wait for the other function to be finished.

The first function concerns a local decision about whether an incoming request can be accepted or not. The individual steps of this function are, in accordance with the numbers 1 to 6 in FIG. 2, as follows:

1 a request arrives at the receiver module R;
2 a decision is taken by the resource consumption decision module Dm whether the request is accepted or not, based on a decision algorithm which will be described later on;
3 accepted requests are placed in a queue Q;
4 the local resource consumption counter L is updated;
5 the consumer or client application CA receives the requested service, assuming that the request had been accepted before; and
6 the updated value of the local resource consumption counter L is provided as input to the decision module Dm.

The second function concerns a synchronous update of the global resource consumption counter G. The respective steps are, in accordance with the characters A to D in FIG. 2, as follows:

A the amount of locally accepted resource consumption is read from the queue Q. This includes the data of all requests that have been accepted by the decision module Dm of the respective proxy server $S_x$ and are not yet synchronized with the global resource consumption counter G (see below);
B The amount of resources which has been consumed by a given instance is added to the global resource consumption counter G, the local queue Q is reset to zero and the new value of the global resource consumption counter G is read;
C the local resource consumption counter L is set to the value of the recently updated global resource consumption counter G; and
D the new global resource consumption counter value is provided as input to the decision module Dm.

With respect to the synchronization step B, different embodiments can be envisaged. In one embodiment, there is a central resource management system CRM (cf. FIG. 3) where resources are provisioned and which also maintains the global resource consumption counter G. In its simplest form, the typical client server model is followed, where the local proxy server $L_x$ takes the role of the client and the central resource management system CRM takes the role of the server. Client requests are processed by the server one by one, and the response includes the updated global counter.

In another embodiment the synchronization is achieved with the use of messages between the nodes. In this scenario, a messaging system is used. All local proxy servers register for events by other proxy servers. On the reception of the event by the other proxy servers, the global resource consumption counter G, which is locally maintained, gets updated. Additional measures might be needed in this case to ensure that the global resource consumption counter G is consistently updated in all local systems.

In still another embodiment a master/slave arrangement between the instances is used to decide how the master copy of the global resource consumption counter G is maintained. Technically, this is similar to the first embodiment, in the sense that all requests queued to a local proxy server $S_x$ are sent to a single server, the difference being that the server receiving the requests and maintaining the global resource consumption counter G is any of the local proxy servers $L_x$ with the master role.

The following table further explains the process of the synchronization of the local resource consumption counter L with the global resource consumption counter G by means of an example:

| Time | Event | Proxy #1 (P1) | Proxy #2 (P2) | Proxy #3 (P3) | Global Resource consumption (G) |
|---|---|---|---|---|---|
| $t_0$ | | Q = 0<br>L = 0 | Q = 0<br>L = 0 | Q = 0<br>L = 0 | 0 |
| $t_1$ | 10 → P1, | Q = 10<br>L = 10 | Q = 0<br>L = 0 | Q = 0<br>L = 0 | 0 |
| $t_2$ | 5 → P2, | Q = 10<br>L = 10 | Q = 5<br>L = 5 | Q = 0<br>L = 0 | 0 |
| $t_3$ | 7 → P3, | Q = 10<br>L = 10 | Q = 5<br>L = 5 | Q = 7<br>L = 7 | 0 |
| $t_4$ | 3 → P1, | Q = 13<br>L = 13 | Q = 5<br>L = 5 | Q = 7<br>L = 7 | 0 |
| $t_5$ | Synch P1 | Q = 0<br>L = 13 | Q = 5<br>L = 5 | Q = 7<br>L = 7 | 13 |
| $t_6$ | 2 → P1, | Q = 2<br>L = 15 | Q = 5<br>L = 5 | Q = 7<br>L = 7 | 13 |
| $t_7$ | Synch P2 | Q = 2<br>L = 15 | Q = 0<br>L = 18 | Q = 7<br>L = 7 | 18 |
| $t_8$ | Synch P3 | Q = 2<br>L = 15 | Q = 0<br>L = 18 | Q = 0<br>L = 25 | 25 |
| $t_9$ | 5 → P2, | Q = 2<br>L = 15 | Q = 5<br>L = 23 | Q = 0<br>L = 25 | 25 |
| $t_{10}$ | Synch P1, | Q = 0<br>L = 27 | Q = 5<br>L = 23 | Q = 0<br>L = 25 | 27 |

The system in the example comprises three proxy servers (P1 to P3). At time $t_0$ the system has not processed any requests, i.e., the values for the queue Q, the local resource consumption counter L and the global resource consumption counter G are zero. At time $t_1$ a request for 10 "resources" is accepted by the decision module Dm of proxy server P1. The queue Q at P1 is incremented by 10, since this amount of resources is not yet synchronized with the global resource consumption counter G. The local resource consumption at P1 is also set to 10, as this is the "global resource consumption counter value" as seen by P1 at this time.

At time $t_2$ a request for 5 resources is accepted by the decision module Dm of proxy server P2. In a similar manner as before, the queue Q at P2 is incremented by 5, and the local resource consumption at P2 is also set to 5. The same holds true for times $t_3$ and $t_4$ with respect to accepted requests by proxy servers P3 and, again, P1.

At time $t_5$ the local resource consumption counter L of proxy server P1 is synchronized with the global resource consumption counter G. The global resource consumption is set to 13 (same as the local resource consumption at P1), and the queue Q of proxy server P1 is reset.

The next request for 2 resources arriving at time $t_6$ at P1 increases the queue Q and the local resource consumption value of P1 by 2.

At time $t_7$, proxy server P2 synchronizes with the global resource consumption counter G. The locally accepted resources at P2 (L=5) are added to the global resource consumption counter G (13) and the new global resource consumption counter value becomes 18. The queue Q at P2 is reset to 0 and the local resource consumption counter is set to the global resource consumption counter value.

In a similar manner, at time $t_8$ the data of proxy server P3 are synchronized, i.e., another 7 resources are added to the global resource consumption counter G, the value of G now being 25. The queue Q of P3 is reset and L is updated accordingly.

At time $t_9$ a request for 5 resources is accepted by the decision module of proxy server P2. In a similar manner as before, the queue Q and the local resource consumption counter are incremented by 5 to Q=5 and L=23.

Finally, at time $t_{10}$, proxy server P1 synchronizes again with the global resource consumption counter G. Its queue Q with 2 resources is added to the global resource consumption counter G, which increases the global resource consumption value from 25 to 27. The local resource consumption counter is synchronized with the global resource consumption usage to be 27.

The decision for accepting or rejecting a resource consumption request takes place locally on each proxy server $L_x$ by the resource consumption decision module Dm, taking into account data that are locally available at that specific server.

As already mentioned before, the calculating means present in the decision modules Dm of each proxy server may be represented by a respective algorithm. The following is an example for an algorithm for carrying out the decision by the respective decision module Dm whether to accept or to reject the respective request, thereby using the following inputs:

a. the provisioned maximum limit for the given resource P
b. the local resource consumption counter value L
c. the synchronized global resource consumption value G
d. the amount of resources to be consumed by the request R On every new request, at time $t_x$, the request is accepted if $$P(G_{tx}) + R \leq P$$

where $$P(G_{tx}) = \frac{G_{ts} - L_{ts}}{t_s - t_{s-1}}(t_x - t_s) + L_{tx}$$

$P(G_{tx})$ is the projection of global resource consumption G at time $t_x$, which is the time when a new request arrives. $t_s$ and $t_{s-1}$ are the times where synchronization between the global resource consumption G and its local copy L occurred prior to $t_x$. $G_t$ and $L_t$ are the global and local resource consumption, respectively, at time t.

EXAMPLE

Consider the above example of a file sharing service, where a group of users has purchased a license for 100 GB of storage. The service is provided by N servers. The following events occur (where n/a means not applicable):

| Time | Event | Local Usage ($L_t$) | Global Usage ($G_t$) | Projected Usage $P(G_t)$ | Limit | Decision | New Local Usage $L_{t'}$ |
|---|---|---|---|---|---|---|---|
| $t_0 = 0$ | Synch | — | 40 | n/a | — | n/a | 40 |
| $t_1 = 5$ | Synch | 40 | 50 | n/a | 100 | n/a | 50 |

| Time | Event | Local Usage ($L_t$) | Global Usage ($G_t$) | Projected Usage $P(G_t)$ | Limit | Decision | New Local Usage $L_{t^+}$ |
|---|---|---|---|---|---|---|---|
| $t_2 = 10$ | 5 | 50 | n/a | $\frac{50-40}{5-0}(10-5) + 50 = 60$ | 100 | Accept | 55 |
| $t_3 = 20$ | 10 | 55 | n/a | $\frac{50-40}{5-0}(20-5) + 55 = 85$ | 100 | Accept | 65 |
| $t_4 = 30$ | Synch | 65 | 90 | n/a | 100 | n/a | 90 |
| $t_5 = 32$ | 10 | 90 | n/a | $\frac{90-65}{30-5}(32-30) + 90 = 92$ | 100 | Reject | 80 |

At time $t_0$, the local proxy server P1 synchronizes with the global resource consumption counter G. The local usage is updated to 40.

Five seconds later, at time $t_1$, the local proxy server synchronizes again and the local resource consumption value is updated to 50.

At time $t_2$, i.e., ten seconds after $t_0$, a new request for 5 GB file upload is received. The decision module Dm projects the global resource consumption applying the formula for $P(G_t)$ as follows:

$$P(G_{t_1}) = \frac{G_{ts} - L_{ts}}{t_s - t_{s-1}}(t_x - t_s) + L_{tx} =$$
$$\frac{G_{t1} - L_{t1}}{t_1 - t_0}(t_2 - t_1) + L_{1-} = \frac{50-40}{5-0}(10-5) + 50 = 60$$

The result is that $P(G_2)=60$, hence the request is accepted and the local resource consumption value is increased to 55.

In a similar manner, another request for 10 GB file upload is accepted at time $t_3$, and the local resource consumption value is increased to 65.

At time $t_4$, the proxy server synchronizes again with the global resource consumption counter G. As a result of this synchronization, the local resource consumption value is set equal to the global resource consumption value at time $t_4$, i.e., to 90.

At time $t_5$, a new request for a 10 GB file upload is received. The projection of the global usage is now the following:

$$P(G_{t_1}) = \frac{G_{ts} - L_{ts}}{t_s - t_{s-1}}(t_x - t_s) + L_{tx} =$$
$$\frac{G_{t4} - L_{t4}}{t_4 - t1}(t_5 - t_4) + L_{5-} = \frac{90-65}{30-5}(32-30) + 90 = 92$$

The projected usage is thus calculated at 92 GB. Given the limit of 100 GB and the size of the file upload request, 10, the request is rejected.

In some embodiments more complex projection algorithms can be used. In some other embodiments, new requests are always accepted until the local resource consumption counter exceeds a certain threshold relative to the provisioned limit.

What is claimed is:

1. A system for real-time resource consumption control in a distributed environment comprising:

a multitude of server instances having access to shared resources, each request for a shared resource issued by a client application is handled by one of the server instances, each of the server instances having a processor connected to a non-transitory computer readable medium;

a global resource consumption counter, representing an overall resource consumption of the multitude of server instances at a given time; and a multitude of proxy servers, each proxy server comprising a receiver configured to receive resource consumption requests issued from a client application, a queue for collecting resource consumption requests that have been locally accepted by the respective proxy server, a local resource consumption counter, said local resource consumption counter being updated every time a resource consumption request is accepted by the proxy server;

each proxy server configured to synchronize the global resource consumption counter with the local resource consumption counter such that synchronizing the local resource consumption counter with the global resource consumption counter occurs by adding an amount of resource consumption of at least one of the requests received by the receiver to update the local resource consumption counter;

each proxy server configured so that, for each resource consumption request read from the queue, a difference between the value of the local copy of the global resource consumption counter value and the global resource consumption counter value at the time of synchronization is determined and global resource consumption is projected based on a difference and a time elapsed since a last synchronization of the local copy of the global resource consumption counter and the actual global resource consumption;

wherein each proxy server is configured to carry out a decision on whether to accept or to reject a new request read from the queue based on:

a provisioned maximum limit for a given resource P, a local resource consumption counter value L, a synchronized global resource consumption value G, and an amount of resources to be consumed by the request R;

such that, on every new request, at time $t_x$, the request is accepted if $$P(G_{tx})+R \leq P$$

where $$P(G_{tx}) = \frac{G_{ts} - L_{ts}}{t_s - t_{s-1}}(t_x - t_s) + L_{tx},$$

wherein
$P(G_{tx})$ is the projection of global resource consumption G at time $t_x$, which is the time when a new request arrives, $t_s$ and $t_{s-1}$ are the times where synchronization between the global resource consumption G and its local copy L, occurred prior to $t_x$, and wherein $G_t$ and $L_t$ are the global and local resource consumption, respectively, at time t.

2. The system of claim 1, wherein the distributed environment is a Software as a Service (SaaS) environment.

3. The system of claim 1, wherein the system is configured as a network.

4. The system of claim 1, wherein each of the server instances is a computer device.

5. The system of claim 4, wherein each of the proxy servers is a computer device.

6. The system of claim 1, wherein each of the proxy servers is a computer device.

7. The system of claim 1, wherein the global resource consumption counter is a computer device that is communicatively connected to the server instances and/or the proxy servers.

8. The system of claim 1, wherein the system is a communication system.

9. The system of claim 1, wherein a load balancer is configured to distribute requests issued by at least one client application to the multitude of server instances.

10. A communication apparatus comprising:
a multitude of proxy servers, each of the proxy servers having a processor connected to a non-transitory computer readable medium, each proxy server also comprising
a receiver configured to receive resource consumption requests issued from a client application,
a queue for collecting resource consumption requests that have been locally accepted by the respective proxy server,
a local resource consumption counter, said local resource consumption counter being updated every time a resource consumption request is accepted by the proxy server;
each proxy server configured to synchronize a global resource consumption counter representing an overall resource consumption of a multitude of server instances at a given time with the local resource consumption counter such that synchronizing the local resource consumption counter with the global resource consumption counter occurs by adding an amount of resource consumption of at least one of the requests received by the receiver to update the local resource consumption counter;
each proxy server configured so that, for each resource consumption request read from the queue, a difference between the value of the local copy of the global resource consumption counter value and the global resource consumption counter value at the time of synchronization is determined and global resource consumption is projected based on a difference and a time elapsed since a last synchronization of the local copy of the global resource consumption counter and the actual global resource consumption;
wherein each proxy server is configured to carry out a decision on whether to accept or to reject a new request read from the queue based on:
a provisioned maximum limit for a given resource P,
a local resource consumption counter value L,
a synchronized global resource consumption value G, and
an amount of resources to be consumed by the request R;
such that, on every new request, at time $t_x$, the request is accepted if $$P(G_{tx})+R \leq P$$

where $$P(G_{tx}) = \frac{G_{ts} - L_{ts}}{t_s - t_{s-1}}(t_x - t_s) + L_{tx},$$

wherein
$P(G_{tx})$ is the projection of global resource consumption G at time $t_x$, which is the time when a new request arrives, $t_s$ and $t_{s-1}$ are the times where synchronization between the global resource consumption G and its local copy L, occurred prior to $t_x$, and wherein $G_t$ and $L_t$ are the global and local resource consumption, respectively, at time t.

11. The communication apparatus of claim 10, wherein the distributed environment is a Software as a Service (SaaS) environment.

12. The communication apparatus of claim 10, wherein the system is configured as a network.

13. The communication apparatus of claim 10 wherein each of the proxy servers is a computer device.

14. The communication apparatus of claim 10, comprising the server instances, each of the service instances being a computer device.

15. The communication apparatus of claim 10, comprising the global resource consumption counter, the global resource consumption counter being a computer device that is communicatively connected to the proxy servers.

16. A computer-implemented method for real-time resource consumption control in a distributed computing environment, the environment comprising:
a multitude of proxy servers, each of the proxy servers having a processor connected to a non-transitory computer readable medium, each proxy server also comprising
a receiver configured to receive receiving resource consumption requests issued from a client application,
a queue for collecting resource consumption requests that have been locally accepted by the respective proxy server,
a local resource consumption counter, representing the global resource consumption as seen by the respective proxy server, said local resource consumption counter being updated every time a resource consumption request is accepted, and the method comprising:
a) reading, from the queue, the amount of resource consumption of a request received by the receiver that is accepted;

b) synchronizing the local resource consumption counter with a global resource consumption counter by adding the amount read in step a) to the global resource consumption counter;
c) updating the local resource consumption counter with a local copy of the global resource consumption counter value from step b);
d) on every new request read from the queue, determining the difference between the value of the local copy of the global resource consumption counter value and the global resource consumption counter value at the time of synchronization; and
e) projecting the global resource consumption based on the difference determined in step d) and the time elapsed since the last synchronization of the local copy of the global resource consumption counter and the actual global resource consumption at the time of each synchronization step; and
f) determining whether to accept or to reject each new request based on:
   a provisioned maximum limit for a given resource P,
   a local resource consumption counter value L,
   a synchronized global resource consumption value G, and
   an amount of resources to be consumed by the request R;
such that, on every new request, at time $t_x$, the new request is accepted if $$P(G_{tx})+R \leq P$$

where:

$$P(G_{tx}) = \frac{G_{ts} - L_{ts}}{t_s - t_{s-1}}(t_x - t_s) + L_{tx},$$

$P(G_{tx})$ being the projection of global resource consumption G at time $t_x$, which is the time when a new request arrives, $t_s$ and $t_{s-1}$ are the times where synchronization between the global resource consumption G and its local copy L, occurred prior to $t_x$, and wherein $G_t$ and $L_t$ are the global and local resource consumption, respectively, at time t.

17. The method of claim 16, wherein the global resource consumption counter is a counter representing an overall resource consumption of a multitude of server instances at a given time.

18. The method of claim 17, comprising:
at least one of the multitude of server instances receiving at least one request for a shared resource issued by the client application.

19. The method of claim 18, comprising:
at least one of the multitude of server instances informing one of the proxy servers of the at least one request for the shared resource issued by the client application.

20. The method of claim 16, wherein each of the proxy servers is a computer device.

* * * * *